United States Patent [19]

Seo et al.

[11] Patent Number: 5,264,973
[45] Date of Patent: Nov. 23, 1993

[54] DOOR OPENING SYSTEM FOR AN ELECTRONIC HOUSEHOLD APPARATUS

[75] Inventors: Hwan Seo; Kwon-pyo Hong, both of Kyunggi, Rep. of Korea

[73] Assignee: Samsung Electronics Co., Ltd., Suwon, Rep. of Korea

[21] Appl. No.: 501,792

[22] Filed: Mar. 30, 1990

[30] Foreign Application Priority Data

Mar. 31, 1989 [KR] Rep. of Korea .................. 89-4141
Dec. 28, 1989 [KR] Rep. of Korea .................. 89-21388

[51] Int. Cl.⁵ .................................................. G11B 5/027
[52] U.S. Cl. ...................................... 360/85; 360/96.5; 360/137
[58] Field of Search .............. 360/96.5, 85, 95, 137; 49/25-28, 32

[56] References Cited

U.S. PATENT DOCUMENTS

| | | | |
|---|---|---|---|
| 3,427,521 | 2/1969 | Goldstein | 49/25 |
| 4,328,540 | 5/1982 | Matsuoka | 49/28 X |
| 4,565,029 | 1/1986 | Kornbrekke | 49/25 |
| 4,638,433 | 2/1987 | Schindler | 49/28 X |
| 4,694,607 | 9/1987 | Ishida | 49/25 |
| 4,695,905 | 9/1987 | Utsugi | 360/60 X |
| 4,831,509 | 5/1989 | Jones | 49/28 X |
| 4,887,205 | 12/1989 | Chou | 49/28 X |
| 4,974,102 | 11/1990 | Hamachi | 360/98.06 X |

FOREIGN PATENT DOCUMENTS 58-164050  9/1983  Japan ..................... 360/93

Primary Examiner—A. J. Heinz
Attorney, Agent, or Firm—Robert E. Bushnell

[57] ABSTRACT

A door opening system of the present invention automatically opens or closes the front door of a household electric apparatus, more particularly, a VCR. Up to now, a conventional VCR has a disadvantage that the door opening operation is always performed manually by user. The door opening system comprises sensing means which checks the open state of a door switch or a power switch; pulse generating means which generates a switching pulse; and door opening means which opens the power portion and the front door.

22 Claims, 5 Drawing Sheets

DOOR OPENING SYSTEM FOR AN ELECTRONIC HOUSEHOLD APPARATUS

FIELD OF THE INVENTION

The present invention relates to a door opening system for a household electronic device, and more particularly to a door opening system which can automatically open the front door of a VCR.

BACKGROUND OF THE INVENTION

In a household electronic device, such as a VCR, the front door, which is equipped with various operating switches (EJECT, PLAY, STOP, POWER, etc.) tends to have been changed into a single door type due to current design.

In using a conventional VCR however, the provision of a single door has the disadvantage in that the front door must always be opened manually by a user in order to operate the various operating switches whenever the VCR is operated.

SUMMARY OF THE INVENTION

The principal object of the present invention is to provide a door opening system which can automatically open and close the front door of a household electric apparatus by means of a power switch.

It is another object of the present invention to provide a door opening system which can automatically open and close the front door of a VCR activated by the insertion of the cassette tape.

In order to accomplish these and other objects, a door opening system for an electric apparatus having a front door according to the present invention comprises:

sensing means for checking the open state of a door switch or a power switch;

pulse generating means for generating a switching pulse according to the output signal generated in the sensing means; and a door opening means for opening the power source portion and/or the front door actuated by the switching pulse from the pulse generating means.

DESCRIPTION OF THE PREFERRED EMBODIMENT

Figure 1:
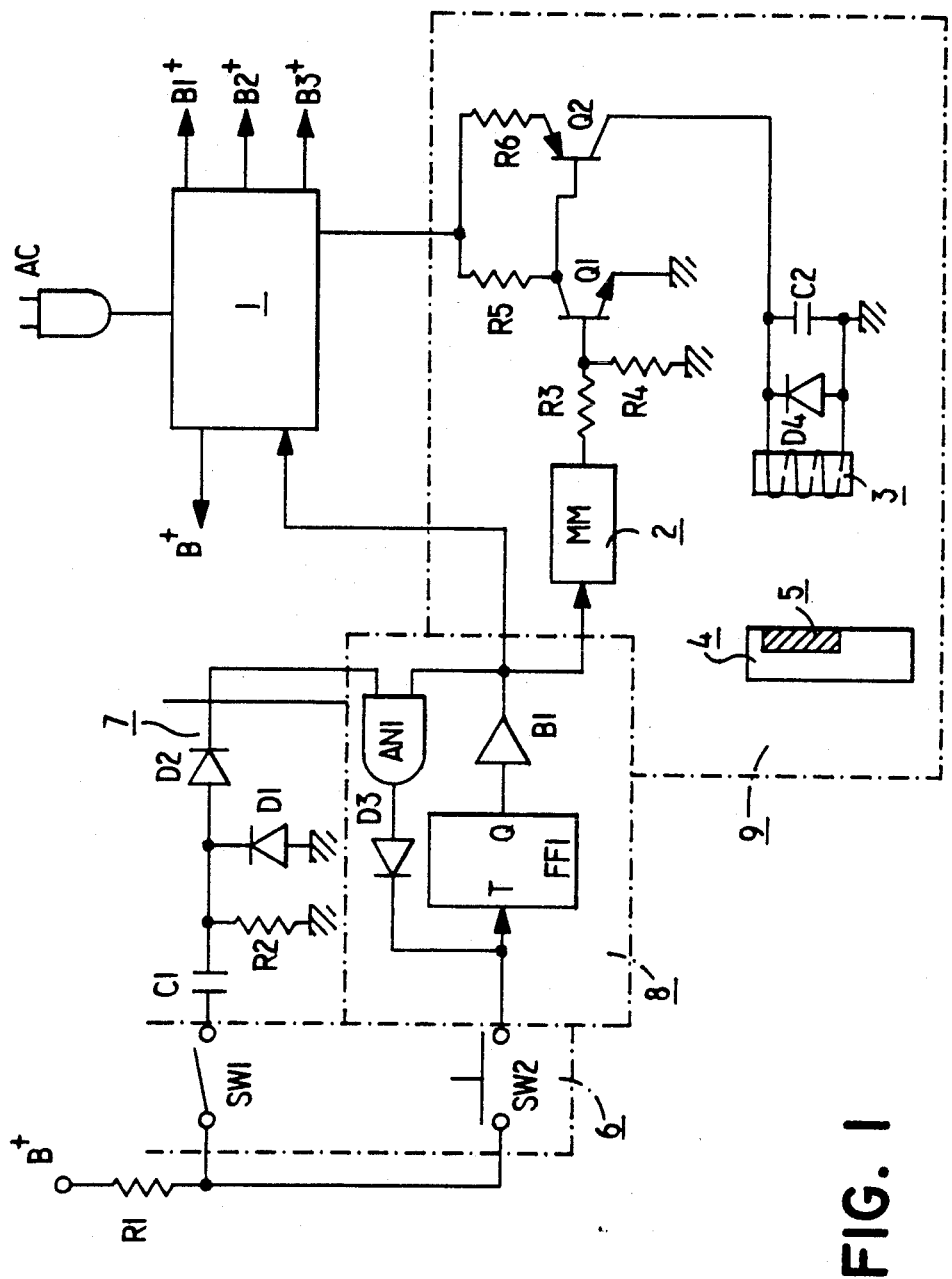
FIG. 1 is a block diagram of a door opening system of one embodiment according to the present invention.

One embodiment of the door opening system according to the present invention has the construction as shown in FIG. 1, which shows the opening operation of the door automatically by a power switch $SW_2$.

The door opening system shown in FIG. 1 comprises a switch operation sensor 6 for sensing the turn ON or Off states of door switch $SW_1$ and/or power switch $SW_2$, a differentiator 7 which differentiates an output signal generated by the operation of the door switch $SW_1$, a switching pulse generator 8 which generates a switching pulse in response to outputs of the differentiator and the power switch $SW_2$, a power source 1 which supplies the set with the operational power according to the switching pulse generated by the switching pulse generator 8, and a door opener g which opens the front door in response to the switching pulse.

Figure 4A:
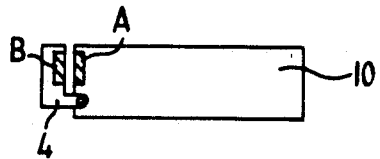
FIGS. 4A and 4B are side elevational views showing the attachment of an optical sensor in the door opening system shown in FIG. 1.
Figure 4B:
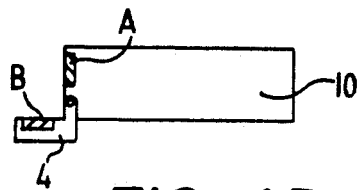
Figure 5:
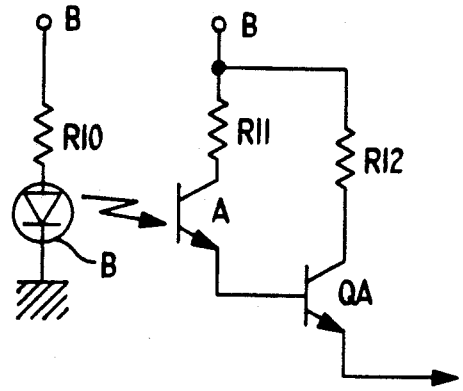
FIG. 5 is a schematic diagram illustrating the construction of the optical sensor shown in FIG. 4.

The switching pulse generator 8 is composed of an AND gate AN1 and a T flip-flop FF1, and the door opener 9 is adapted to operate an electromagnet 3 by driving transistors $Q_1$, $Q_2$ by the output of a multivibrator 2. If the electromagnet 3 is energized, a fixed magnet 5 installed in the door 4 and the electromagnet 3 have the same polarity. FIGS. 4A and 4B are diagrams showing the attachment state of the optical sensor in the front door 4. The optical sensor A of the main body stands opposite from the optical sensor B of the door, and a circuit diagram of optical sensors A,B, of FIG. 4, is as shown in FIG. 5.

Namely, the optical sensor B of FIG. 4 which emits light is attached to the door 4 and the optical sensor A which receives light is attached to the main body opposite to the optical sensor B. And, in order to prevent an undesired operation triggered by outside light, optical sensors A,B are fixed to a bracket which has a mechanically fixed light passage.

Figure 8:
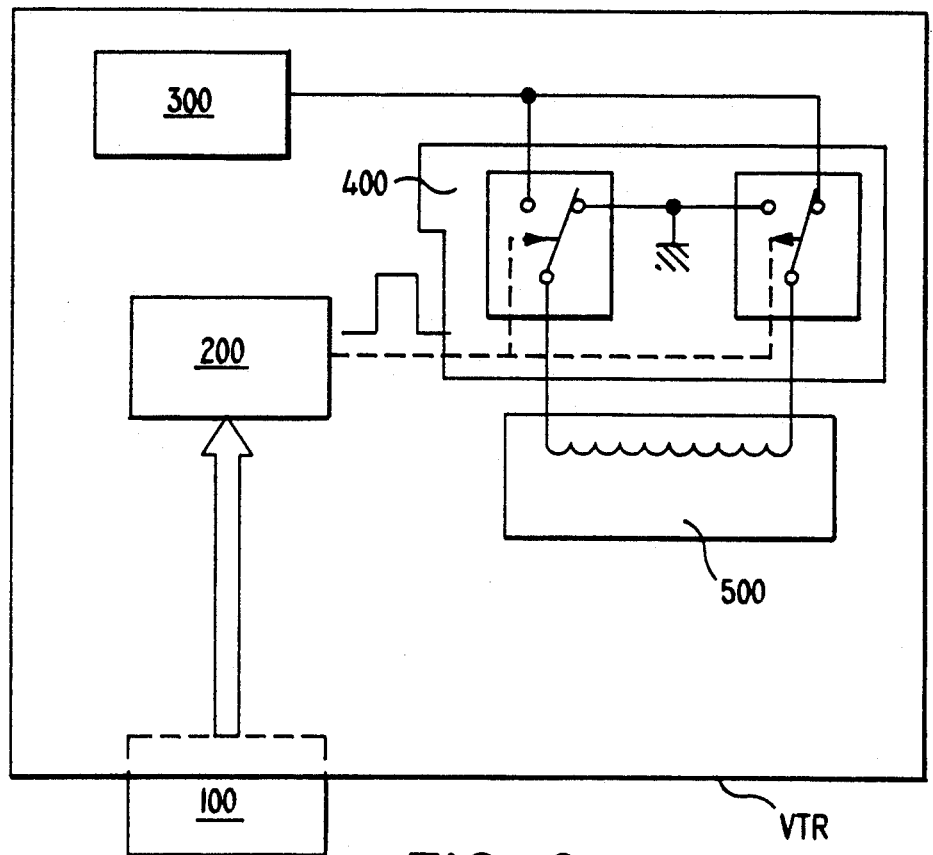
FIG. 8 is a block diagram illustrating the door opening system of still another embodiment according to the present invention.
Figure 9:
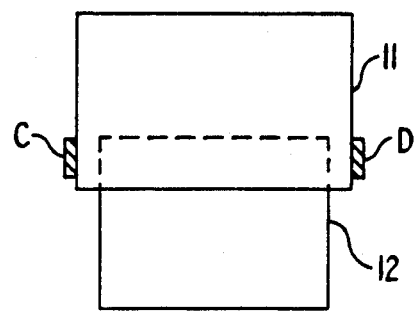
FIG. 9 is a top planar installation diagram of the optical sensor in a cassette housing of the door opening system shown in FIG. 8.

Also in a different embodiment in which the front door is intended to open in response to the insertion of a cassette tape cartridge, as is illustrated in FIGS. 8 and 9, the optical sensors C,D of the door opening system are respectively installed in the right and the left side of the cassette housing into which cassette tape cartridge 12 is inserted.

If the optical sensors C,D are installed in the cassette housing 11 as mentioned above, a driving circuit can be composed as shown in FIG. 8.

The driving circuit comprises a sensing portion 200 which senses the insertion of VCR cassette tape cartridge 100 by the receiving of light emitted from the optical sensors C,D, and a door driving portion 500 which operates the door by a control signal which is from the sensing portion 200.

Figure 6:
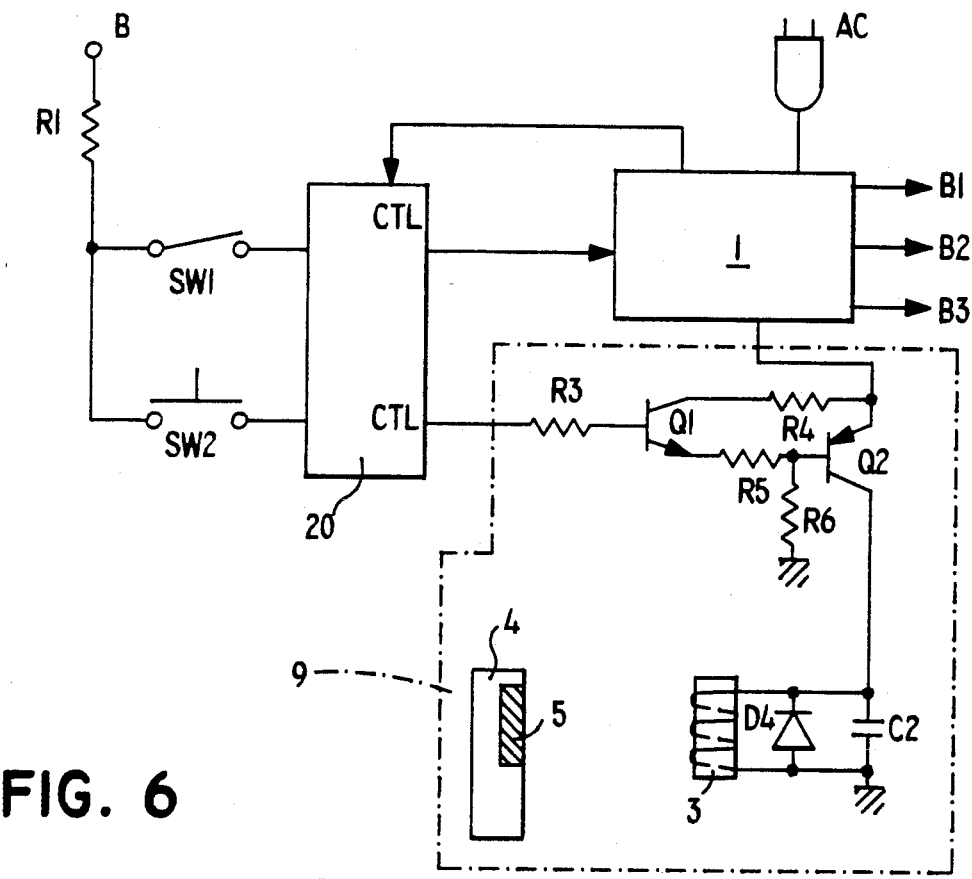
FIG. 6 is a block diagram illustrating the door opening system of another embodiment according to the present invention.
Figure 7:
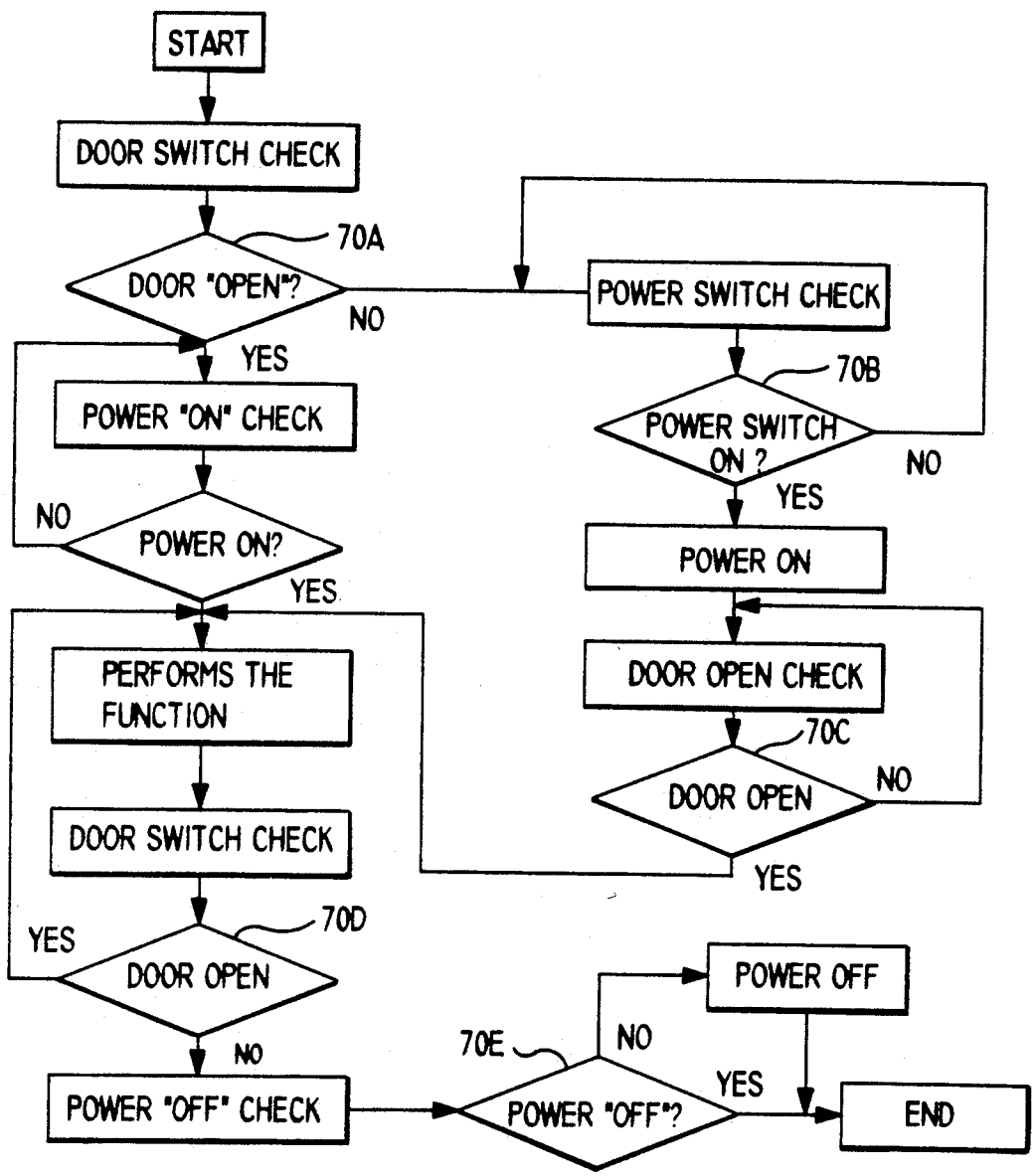
FIG. 7 is an operation flow chart of the door opening system shown in FIG. 6.

Also, FIG. 6 is another embodiment which is formed by using microcomputer 20 instead of the differentiator 7 and the switching pulse generating portion 8 shown in FIG. 1. The operational flow chart of the microcomputer 20 is shown in FIG. 7.

The operation of the present invention having the construction as above described will be explained.

Figure 2:
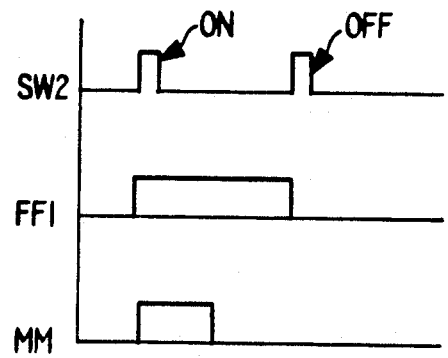
FIG. 2 and FIG. 3 are waveform diagrams for explaining the operation of the door opening system shown in FIG. 1.

As shown in FIG. 1, in the initial state, that is, in the state in which the front door is closed, door switch $SW_1$ is in the ON state. At this time if power switch $SW_2$ which is a track (i.e., a "slide") type switch is pushed, one pulse is applied to an input terminal T of the T flip-flop FF1 as shown in FIG. 2. Therefore, an output terminal Q of the flip/flop FF1 outputs a high level as shown in FIG. 2, and the output signal of the flip-flop FF1 is applied to an AND gate AN1 through a buffer B1 and simultaneously to a power source and a multivibrator 2.

If the output signal of the flip-flop FF1 is applied to the power source portion, the power source 1 generates the electric potentials B1+,B2+,B3+ which are required for the driving of the set and a low output of the multivibrator 2 is delayed for a predetermined time from the output of the flip-flop FF1 as shown in FIG. 2. The low output signal of the multivibrator 2 drives the transistors $Q_1,Q_2$ so that the electromagnet 3 is energized.

As described above, if the electromagnet 3 is energized, the electromagnet 3 has the same polarity as the fixed magnet 5 installed in the door 4. Therefore the door moves in the opposite direction of the fixed electromagnet 3 and is at last opened.

As described above, in order to open the door 4, after the current flows for a predetermined time, the output signal of the multivibrator 2 drops to a low level. At this time the output waveforms of power switch $SW_2$, flip-flop FF1 and multivibrator 20 are shown in FIG. 2.

In the final state when the door is closed, if the power switch SW1 is made to go to an ON state, the flip-flop FF1 of the switching pulse generating portion 8 is operated and an output signal of the flip-flop FF1 is applied to the power source 1 to drive the set and is simultaneously applied to the multivibrator 2. The output signals of the multivibrator operate the electromagnet 3 for a predetermined time to open the door 4.

As described above, if the power switch $SW_2$ is made to go to ON state in the initial state, the set is operated and simultaneously the door 4 is opened. In a door open state, a door switch $SW_1$ goes to the OFF state and the power switch $SW_2$ which is a switch of a slide type goes to the OFF state. In this state, the user operates the set by using inner operation switches.

However, after the use of the set is finished, if a user closes the door 4, power goes to the OFF state. Namely, if the door 4 is closed after finishing the use of the set, the door switch $SW_1$ goes to the ON state. If the door switch SW goes to the ON state, one pulse is generated in the differential circuit and the pulse is to the T terminal of the flip-flop FF1 through AND gate AN1 and an output signal of the flip-flop FF1 drops to a low level. The output signal is applied to the power source portion 1 and at least power goes to an OFF state, and the set is changed to standby state which supplies a standby power source STB only.

Therefore, the door open system according to the present invention can more conveniently be used because the power goes to the OFF state automatically without the operation of a power switch if the door 4 is closed, compared with the conventional type in which user must push the power switch and close the door 4 after using the set.

Figure 3:
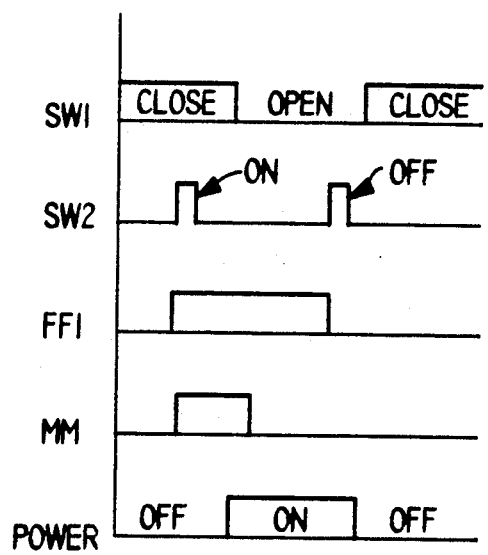

FIG. 3 shows each waveform of the present invention with respect to the power ON and OFF states.

The door switch which has an ON or OFF state corresponding to the opening or closing of the door, is formed as a switching means. However, the door switch can be replaced by the attachment of optical sensors A,B, as shown in FIGS. 4A and 4B. FIGS. 4A and 4B show that optical sensors A,B are installed in the door 4 and in the main body 10, respectively, and FIG. 5 shows the sensing circuit for this.

At this time, in order to prevent an undesired operation triggered by sun-light or lamp light, the optical sensors A,B are fixed to the bracket which has the light passage.

Namely, if the door 4 is closed, the light of an emitting optical sensor B is applied to a receiving optical sensor A, so that a transistor QA is turned on and a high level is applied to the differentiator, in the same manner as the door switch $SW_1$ of FIG. 1, which is a mechanical switch that goes to an ON state. Thus, if the door 4 is opened, the light of the emitting optical sensor B is not applied to the receiving optical sensor A. Consequently the transistor QA is turned off and a low level is applied to the differentiator, in the manner that door switch $SW_1$ of FIG. 1 goes to the OFF state.

Therefore, it has the same effect with optical sensors A,B installed in the main body 10 and in the door 4 instead of the mechanical door switch $SW_1$.

In the alternative, the door may be opened by the insertion of a cassette tape Cartridge, as the door is opened by the power switch operation.

For the sake of this, optical sensors C,D should respectively be installed in the right and left side of the cassette housing 11 as shown in FIG. 9; FIG. 8 shows the schematic diagram for this operation.

Namely, when a cassette tape cartridge 100 is inserted, a sensing portion 200 which is installed in the cassette housing senses a tape insertion, and then, the switch 400 goes to an ON state by generating an insertion sensing pulse to the switch 400.

If the switch 400 goes to an ON state by sensing an insertion of the tape cartridge 100 in the sensing portion 200, the power from a power supply portion 300 drives a motor of the driving portion 500, which in turn, generates a driving force of opening or closing the door through the switch 400 which is in ON state. A dynamic force of the motor is transmitted to the door through a dynamic force transmission crank shaft, and then, the door is opened by a circular motion of the door about an axis.

Namely, the switch 400 goes to an ON state by the output signal of the sensing portion 200 which senses the insertion operation of the tape cartridge 100, and then, the power from the power supply portion 300 drives the motor and the driving force of the motor is transmitted to the door through the dynamic force transmission crank shaft, and at last the door is opened by circular motion of the door about the axis.

FIG. 6, shows another embodiment of the present invention.

As shown in FIG. 6, microcomputer 20 performs the program depending on the door switch $SW_1$, power switch $SW_2$, and remote controller key input, so that the driving of the power source portion 1 and the door open portion is controlled, and the operation of each function control portion (which is not shown) is controlled.

FIG. 7 shows the operational flow chart of the microcomputer 20 shown in FIG. 6.

The microcomputer first checks the input signal of the door switch $SW_1$ at step 70A. If the door 4 is not in an open state, the microcomputer performs the 70B step which judges whether the power switch $SW_2$ is in an ON state or not by checking the power switch $SW_2$. If the power switch $SW_2$ is in an ON state in a situation where the door 4 is not opened, the microcomputer performs a process which turns on the power and opens the door 4 simultaneously. Through the above described 70B process, if the door 4 is opened in the 70C process, the microcomputer checks whether the door 4 is closed or not as the 70D process, performing each function depending on the function key input. If the door 4 is subsequently closed, the power goes to an OFF state by performing the 70E process and the operation is finished. If the door switch SW$_1$ is checked at step 70A and the door 4 is open, the microcomputer checks whether the power is in an ON state. If the power is in an ON state, the microcomputer performs each function depending on the function key input as described above.

As described above, according to the present invention, the front door of the VCR is opened automatically when the power switch goes to an ON sate, while power goes to an OFF state automatically when the front door is closed. In addition, and at the same time the front door of VCR is opened automatically when the VCR tape is inserted.

What is claimed is:

1. A video tape recorder, comprising:
   user selectable function keys for enabling operational modes of said video tape recorder;
   a function key door providing user access to said function keys;
   tape cassette insertion detector means for generating an insertion signal indicative of user insertion of a tape cassette into said video tape recorder; and
   means for automatically opening said function key door in response to said insertion signal thereby allowing user access to said function keys.

2. A video tape recorder as claimed in claim 1, further comprised of said automatic opening means opening said function key door in response to a user activating a power switch to turn on said video tape recorder.

3. A process performed by a video tape recorder, said process comprising:
   determining whether a function key door is opened by a user, said function key door for covering function keys enabling user selection of operational modes of said video tape recorder;
   determining whether a power switch is activated, said power switch for enabling a user to turn on said video tape recorder by providing operational power;
   in response to one of a user opening said function key door and a user activating said power switch, providing operational power to turn on said video tape recorder; and
   in response to a user closing said function key door, disabling operational power to thereby turn off said video tape recorder.

4. An apparatus for opening a door of a video tape recorder having a housing and a power supply, said apparatus comprising:
   means for sensing when a tape cartridge is inserted into said housing, and for generating a switching signal indicative of said tape being inserted into said housing;
   door driving means for opening said door in response to a voltage supplied from said power supply; and
   switch means responsive to said switching signal for receiving said voltage from the power supply and for providing said voltage to said door driving means.

5. An apparatus as claimed in claim 4, wherein said means for sensing comprises optical sensor means having a light emitting diode and a light receiving diode, for generating said sensing signal when said inserted tape prevents said light receiving diode from receiving a light emitted by said light emitting diode.

6. A recording and/or playback device having a power source, said device comprising:
   user selectable function keys for enabling operational modes of said device;
   a function key door having an open position and a closed position, for barring user access to said function keys while in said closed position;
   door switch means for providing an indication signal indicating whether said function key door is in said open position or said closed position;
   power switch means for providing a first pulse in response to being operated a first time;
   means responsive to said first pulse and said indication signal for generating a switching signal to turn on said power source; and
   means responsive to said switching signal and a voltage output from said power source for moving said function key door from said closed position to said open position.

7. A device as claimed in claim 6, wherein said door switch means comprises:
   a light emitting diode mounted on said function key door for emitting light; and
   a light receiving diode mounted in a part of a casing of said device for receiving said emitted light only when said function key door is in said closed position.

8. A device as claimed in claim 6, further comprising:
   differentiation means responsive to said indication signal for generating a second pulse when said indication signal is indicative of said function key door being in said closed position and for providing a logic "0" output when said indication signal is indicative of said function key door being in said open position, wherein said power source is turned on in response to said function key door being moved by a user from said closed position to said open position.

9. A device as claimed in claim 8, wherein said switching signal generating means comprises:
   toggle flip-flop means having an input for receiving said first pulse and an output
   logic gate means having an output for providing a third pulse in response to said second pulse and said switching signal, said output of said logic gate means being connected to said input of said toggle flip-flop means, wherein said toggle flip-flop means turns off said power source in response to said third pulse and said first pulse.

10. A device as claimed in claim 6, wherein said function key door moving means comprises:
    multivibrator means generating a driving signal in response to said switching signal;
    a fixed magnet mounted on said function key door;
    electromagnetic means responsive to said voltage output from said power source, for generating a repulsive force between said fixed magnet and said electromagnetic means to move said door towards said open position; and
    transistor means for providing said voltage output from said power source to said electromagnetic means in response to said driving signal from said multivibrator means.

11. A device as claimed in claim 6, wherein said power switch means provides a second pulse in response to being operated a second time and said means responsive to said first pulse is responsive to said second pulse for turning said power source off.

12. An apparatus for opening a door of an electronic device comprising a power source and user selectable function keys for enabling operational modes of said electronic device, said door having a closed position barring user access to said function keys and an open position allowing user access, said apparatus comprising:
    door switch means for providing an indication signal indicating whether said door is in said open position or said closed position;
    power switch means for providing a first pulse in response to being operated a first time;
    control means having a first input for receiving said first pulse, a second input for receiving said indication signal, a first output for providing a switching signal to said power source and a second output for providing a driving signal; and
    means responsive to said driving signal and a voltage output from the power source for moving said door from said closed position to said open position.

13. An apparatus as claimed in claim 12, wherein said door moving means comprises:
    a fixed magnet of a first polarity mounted in said door;
    electromagnetic means responsive to said voltage output from the power source for generating a repulsive force between said fixed magnet and said electromagnetic means for moving said door; and
    transistor means for providing said voltage output from the power source to said electromagnetic means in response to said driving signal from said control means.

14. A video tape recorder, comprising:
    user selectable function keys for enabling operational modes of said video tape recorder;
    a function key door providing user access to said function keys;
    power switch means for providing operational power to said video tape recorder in response to user selection thereby turning on said video tape recorder; and
    means for automatically opening said function key door in response to the selection of said power switch means thereby allowing user access to said function keys.

15. A video tape recorder as claimed in claim 14, further comprising function key door sensing means for disabling operational power to said video tape recorder thereby turning off said video tape recorder in response to user closure of said function key door.

16. A video tape recorder as claimed in claim 14, further comprised of said automatic opening means opening said function key door in response to user insertion of a video tape cassette into said video tape recorder.

17. A video tape recorder as claimed in claim 14, wherein said function keys are disposed on an inner wall of said function key door.

18. A video tape recorder as claimed in claim 14, further comprising:
    a power source for providing operational power to said video tape recorder;
    door sensing means for providing an indication signal indicating whether said function key door is in an open position or a closed position;
    said power switch means for providing a first pulse in response to being operated a first time;
    means responsive to said first pulse for generating a switching signal to activator said power source; and
    said automatic opening means opening said function key door in response to said switching signal and a voltage output from said power source.

19. A video tape recorder as claimed in claim 18, wherein said door sensing means comprises:
    a light emitting diode mounted on said function key door for emitting light; and
    a light receiving diode mounted in a part of a casing of said video tape recorder for receiving said emitted light only when said function key door is in said closed position.

20. A video tape recorder as claimed in claim 18, wherein said switching signal generating means comprises:
    differentiation means responsive to said indication signal for generating a second pulse when said indication signal is indicative of said function key door being in said closed position;
    toggle flip-flop means having an input for receiving said first pulse and an output for providing said switching signal; and
    logic gate means having an output for providing a third pulse in response to said second pulse and said switching signal, said output of said logic gate means being connected to said input of said toggle flip-flop means, wherein said toggle flip-flop means turns off said power source in response to said third pulse and said first pulse.

21. A video tape recorder as claim in claim 18, wherein said automatic opening means comprises:
    multivibrator means generating a driving signal in response to said switching signal;
    a permanent magnet mounted on said function key door;
    electromagnetic means responsive to said voltage output from said power source, for generating a force repulsive to said permanent magnet to move said door toward said open position; and
    transistor means for providing said voltage output from said power source to said electromagnetic means in response to said driving signal from said multivibrator means.

22. A video tape recorder as claimed in claim 14, wherein said function keys comprise a stop key for enabling a stop mode, a play key for enabling a play mode, and an eject key for ejecting a tape cassette.

* * * * *